US008861342B2

(12) United States Patent
Miclea (10) Patent No.: US 8,861,342 B2
(45) Date of Patent: Oct. 14, 2014

(54) MULTICAST-ONLY FAST RE-ROUTE PROCESSING FOR POINT-TO-MULTIPOINT PSEUDOWIRE

(75) Inventor: Horia M. Miclea, Epalinges (CH)

(73) Assignee: Cisco Technology, Inc., San Jose, CA (US)

( * ) Notice: Subject to any disclaimer, the term of this patent is extended or adjusted under 35 U.S.C. 154(b) by 274 days.

(21) Appl. No.: 13/284,537

(22) Filed: Oct. 28, 2011

(65) Prior Publication Data

US 2013/0107699 A1   May 2, 2013

(51) Int. Cl.
| H04L 12/26 | (2006.01) |
| H04L 12/703 | (2013.01) |
| H04L 12/707 | (2013.01) |
| H04L 12/761 | (2013.01) |
| H04L 12/721 | (2013.01) |

(52) U.S. Cl.
CPC .............. *H04L 45/28* (2013.01); *H04L 45/22* (2013.01); *H04L 45/16* (2013.01); *H04L 45/68* (2013.01)
USPC .......................................................... 370/228

(58) Field of Classification Search
USPC ......................................... 370/228; 725/109
See application file for complete search history.

(56) References Cited

U.S. PATENT DOCUMENTS

| 8,259,563 B1 * | 9/2012 | Kothari et al. ................. 370/225 |
| 2009/0279431 A1 * | 11/2009 | Baruah et al. .................. 370/235 |
| 2010/0014531 A1 * | 1/2010 | Pirbhai et al. ................. 370/401 |
| 2010/0118895 A1 * | 5/2010 | Radulescu .................... 370/503 |
| 2010/0208593 A1 * | 8/2010 | Soon et al. .................... 370/242 |

OTHER PUBLICATIONS

Cisco, "Implementing Layer-3 Multicast Routing on Cisco ASR 9000 Series Routers", Cisco ASR 9000 Series Aggregation Services Router Multicast Configuration Guide, MCC-1, 120 pages.
Cisco, "IP Multicast Technology Overview", dated Sep. 2000, 24 pages.
Cisco, "Understanding MPLS-TP and Its Benefits", dated 2009, 6 pages.
Cisco, "Innovations for Lossless Video Delivery Architecture", Dated 2010, 9 pages.

* cited by examiner

*Primary Examiner* — Wei Zhao
(74) *Attorney, Agent, or Firm* — Hickman Palmero Truong Becker Bingham Wong LLP (57) ABSTRACT

To protect a multicast data stream for a multicast group, two P2MP pseudowires are established to deliver multicast data for the particular multicast group to an aggregation node. The two P2MP pseudowires are defined such that the pseudowires have no transport nodes in common other than the aggregation node. The aggregation node replicates data received via a primary pseudowire of the two P2MP pseudowires to subscribers of the multicast group. The aggregation node monitors the data from the primary pseudowire to detect failures in the data flow. When a failure is detected in the primary data stream, the aggregation node replicates data received via a secondary pseudowire of the two P2MP pseudowires for delivery to the multicast group subscribers.

28 Claims, 4 Drawing Sheets

302
RECEIVE DATA PACKETS, AT AN AGGREGATION NODE FROM ONE OR MORE SOURCE NODES, VIA BOTH A PRIMARY POINT-TO-MULTIPOINT PATH AND A SECONDARY POINT-TO-MULTIPOINT PATH OVER A NETWORK; WHEREIN TRANSPORT NODES OF THE PRIMARY POINT-TO-MULTIPOINT PATH AND THE SECONDARY POINT-TO-MULTIPOINT PATH HAVE NO COMMON POINTS OF PHYSICAL TOPOLOGY OTHER THAN THE AGGREGATION NODE

304
FORWARD DATA PACKETS, RECEIVED VIA THE PRIMARY POINT-TO-MULTIPOINT PATH, OVER THE NETWORK TO AN ACCESS NODE

306
AFTER FORWARDING THE DATA PACKETS RECEIVED VIA THE PRIMARY POINT-TO-MULTIPOINT PATH, DETECT A FAILURE ON THE PRIMARY POINT-TO-MULTIPOINT PATH AT THE AGGREGATION NODE

308
IN RESPONSE TO DETECTING THE FAILURE, FORWARD, AT THE AGGREGATION NODE, DATA PACKETS RECEIVED VIA THE SECONDARY POINT-TO-MULTIPOINT PATH TO THE ACCESS NODE

FIG. 4

MULTICAST-ONLY FAST RE-ROUTE PROCESSING FOR POINT-TO-MULTIPOINT PSEUDOWIRE

TECHNICAL FIELD

The present disclosure generally relates to protection mechanisms for time-sensitive internet traffic, and more specifically to protecting against failure of multicast data streams, such as video streams and Internet Protocol Television streams, that are transported via packet transport systems that allow defining divergent packet paths.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Internet Protocol (IP) multicast conserves bandwidth and reduces traffic by simultaneously delivering a single stream of information to potentially thousands of subscribers while reducing processing burden on the source and the receivers. Multicast packets are replicated in the network at the point where paths diverge by routers enabled with Protocol Independent Multicast (PIM) and other supporting multicast protocols, resulting in the most efficient delivery of data to multiple receivers.

For example, subscribers to a multicast group may express interest in receiving a video data stream from a particular source by sending an Internet Group Management Protocol (IGMP) host report to routers in a network to which the subscribers are connected. The routers are then responsible for delivering data for the video data stream from the source to the receivers. The routers use PIM to dynamically create a multicast distribution tree. The video data stream is delivered only to the network segments that are in the path between the source and the subscriber devices.

Point-to-Multipoint (P2MP) is a method of communication for efficient multicast data distribution from a source to a set of receivers. Multi-Protocol Label Switching (MPLS) enables P2MP communication based on P2MP Label Switch Path (LSP), which can be configured by an operator in the context of the MPLS Transport Profile (MPLS-TP) or signaled through network protocols like Resource Reservation Protocol—Traffic Engineering (RSVP-TE) in the context of IP/MPLS.

A P2MP LSP may support a transport service, such as a pseudowire. A pseudowire "is a mechanism that emulates the essential attributes of a telecommunications service (such as a T1 leased line or Frame Relay) over a packet-switched network," as described in Request for Comments (RFC) 3985, pages 2-3, published by the Internet Engineering Task Force (IETF). Pseudowires may encapsulate service-specific bit streams, cells, or protocol data units (PDUs) arriving at an ingress port and carrying them across a mechanism for data transport, such as an MPLS LSP.

Pseudowires may be created statically or dynamically. MPLS-TP, which is a simplified version of MPLS for transport networks, may be used to define a static LSP over which static pseudowires may be enabled. The MPLS-TP standard extends MPLS to include support for traditional transport operational models. MPLS-TP uses existing quality of service (QoS) and other support mechanisms already defined within the MPLS standards. Further, MPLS-TP includes the benefits of fast path protection, path-based in-band Operations, Administration, and Maintenance (OAM) protection mechanisms found in traditional transport technologies. MPLS-TP does not include some of the features associated with MPLS, including Penultimate Hop Popping (PHP), LSP merging, and Equal Cost Multi Path (ECMP). MPLS-TP does not require MPLS control plane capabilities and enables the management plane to set up LSPs manually.

Generalized MPLS (GMPLS) and RSVP-TE P2MP signaling can be used to set up an P2MP LSP over which a pseudowire may be run. These signaling protocols support P2MP extensions and the instantiation of explicitly routed LSPs, with or without resource reservations and independent of conventional IP routing. An explicitly routed path can be administratively specified, or automatically computed by a suitable entity based on quality of service (QoS) and policy requirements, taking into consideration the prevailing network state. (See RFC 3209, RFC 3473 and RFC 4875.)

DESCRIPTION OF EXAMPLE EMBODIMENTS

Multicast-only fast re-route processing for point-to-multipoint pseudowire is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 OVERVIEW
2.0 EXAMPLE IMPLEMENTATION OF MULTICAST-ONLY FAST RE-ROUTE PROCESSING
  2.1 SYSTEM FOR STREAMING MULTICAST DATA
  2.2 MULTICAST DATA
  2.3 P2MP PSEUDOWIRE REDUNDANCY
  2.4 UNICAST DATA
3.0 IMPLEMENTATION MECHANISMS—HARDWARE OVERVIEW
4.0 EXTENSIONS AND ALTERNATIVES 1.0 Overview The description herein assumes familiarity with RFCs 3209, 3473, 3985, 4875, 5151, 5654, and 5960, Broadband Forum TR-101, and a chapter entitled "Implementing Layer-3 Multicast Routing on Cisco ASR 9000 Series Routers" in the "Cisco ASR 9000 Series Aggregation Services Router Multicast Configuration Guide", the entire contents of which are hereby incorporated by reference for all purposes as if fully set forth herein.

Multicast-only fast re-route processing for point-to-multipoint pseudowire is described. In an embodiment, an aggregation node receives data packets from one or more source nodes via both a primary point-to-multipoint path and a secondary point-to-multipoint path over a network. The transport nodes of the primary point-to-multipoint path and the secondary point-to-multipoint path have no common points of physical topology other than the aggregation node. Data packets received via the primary point-to-multipoint path are forwarded over the network serving an Ethernet-bridged access node. After forwarding the data packets received via the primary point-to-multipoint path, the aggregation node detects a failure on the primary point-to-multipoint path. In response to detecting the failure, the aggregation node forwards data packets received via the secondary point-to-multipoint path to the access node.

In one embodiment, the primary point-to-multipoint path and the secondary point-to-multipoint path are dynamic pseudowires over label-switched paths that are established using Resource Reservation Protocol point-to-multipoint Traffic Engineering. In another embodiment, the primary point-to-multipoint path and the secondary point-to-multipoint path are static pseudowires over static label-switched paths that are established using multi-protocol label switching-transport profile. The primary and secondary point-to-multipoint paths may be defined as static multicast router (mrouter) ports in the aggregation node. In yet another embodiment, the data packets received via the primary point-to-multipoint path and the secondary point-to-multipoint path are part of an internet protocol television distribution service. In yet another embodiment, the aggregation node receives unicast data packets comprising support information for the internet protocol television distribution service. The unicast data packets may be received via a virtual private wire service between the source node and the aggregation node. In yet another embodiment, the head end of each of the respective pseudowires is the source node.

In another embodiment, after forwarding the data packets received via the secondary point-to-multipoint path, a failure is detected on the secondary point-to-multipoint path. In response to detecting the failure on the secondary point-to-multipoint path, data packets received via the primary point-to-multipoint path are forwarded to the access node.

In other embodiments, the invention encompasses a computer apparatus and a computer-readable medium configured to carry out the foregoing steps.

2.0 Example Implementation Of Multicast-Only Fast Re-Route Processing

In an embodiment, to protect a multicast data stream for a particular multicast group against data loss, two P2MP pseudowires are established to deliver multicast data for the particular multicast group to an aggregation node. The two P2MP pseudowires are defined such that the pseudowires are divergent. In this context, "divergent" indicates that the pseudowires have no transport nodes in common other than the aggregation node. Divergent pseudowires may be accomplished by running the pseudowires over static LSPs that are divergent and defined using MPLS-TP or by running the pseudowires over two different RSVP P2MP TE tunnels with explicit and divergent paths. In one embodiment, all nodes that subscribe to the particular multicast group receive data from at least one of the two P2MP pseudowires.

The aggregation node replicates data received via a primary pseudowire of the two P2MP pseudowires to subscribers of the multicast group that are registered with a bridge domain initiated at an access node and extended by the aggregation node. The aggregation node monitors the IP multicast flows from the primary pseudowire to detect failures in the data flow, for example, packet loss for more than a threshold amount of time. When a failure is detected in the data stream of the primary pseudowire, the aggregation node ceases replicating data from the primary pseudowire and replicates data received via a secondary pseudowire of the two P2MP pseudowires for delivery to the multicast group subscribers. Thus, the subscribers experience limited or no data loss.

In some embodiments, traffic sent via a P2MP tunnel is time-sensitive traffic, for which even small delays are not tolerable. For example, a P2MP tunnel may transport a video data stream to a set of multicast subscribers. An end user can detect delays of more than 50 ms in streaming internet video. Therefore, even small amounts of data loss from a data stream can negatively affect the experience of an end user.

In an embodiment, Multicast-only Fast Re-Route (MoFRR) techniques may be used to provide protection against stream interruption for streaming data being transported via a P2MP pseudowire. MoFRR is a live-live protection mechanism in which streaming data is received at a receiver node from two access paths, a primary path and a secondary path, which do not have any unnecessary common transport nodes, i.e., divergent paths. The receiver node delivers streaming data from the primary path to an access node. The data from the primary path is monitored to detect failures, for example, interruptions in the data stream greater than a threshold amount of time such as 30 ms. Upon detecting a failure, the receiver node provides, to the access node, streaming data from the secondary path instead of streaming data from the primary path. In such a manner, an end user is protected from being adversely affected by streaming data loss from any one path. Applying aspects of MoFRR to protect against interruption of streaming data being transported via a P2MP pseudowire is described in further detail below.

2.1 System for Streaming Multicast Data

Figure 1:
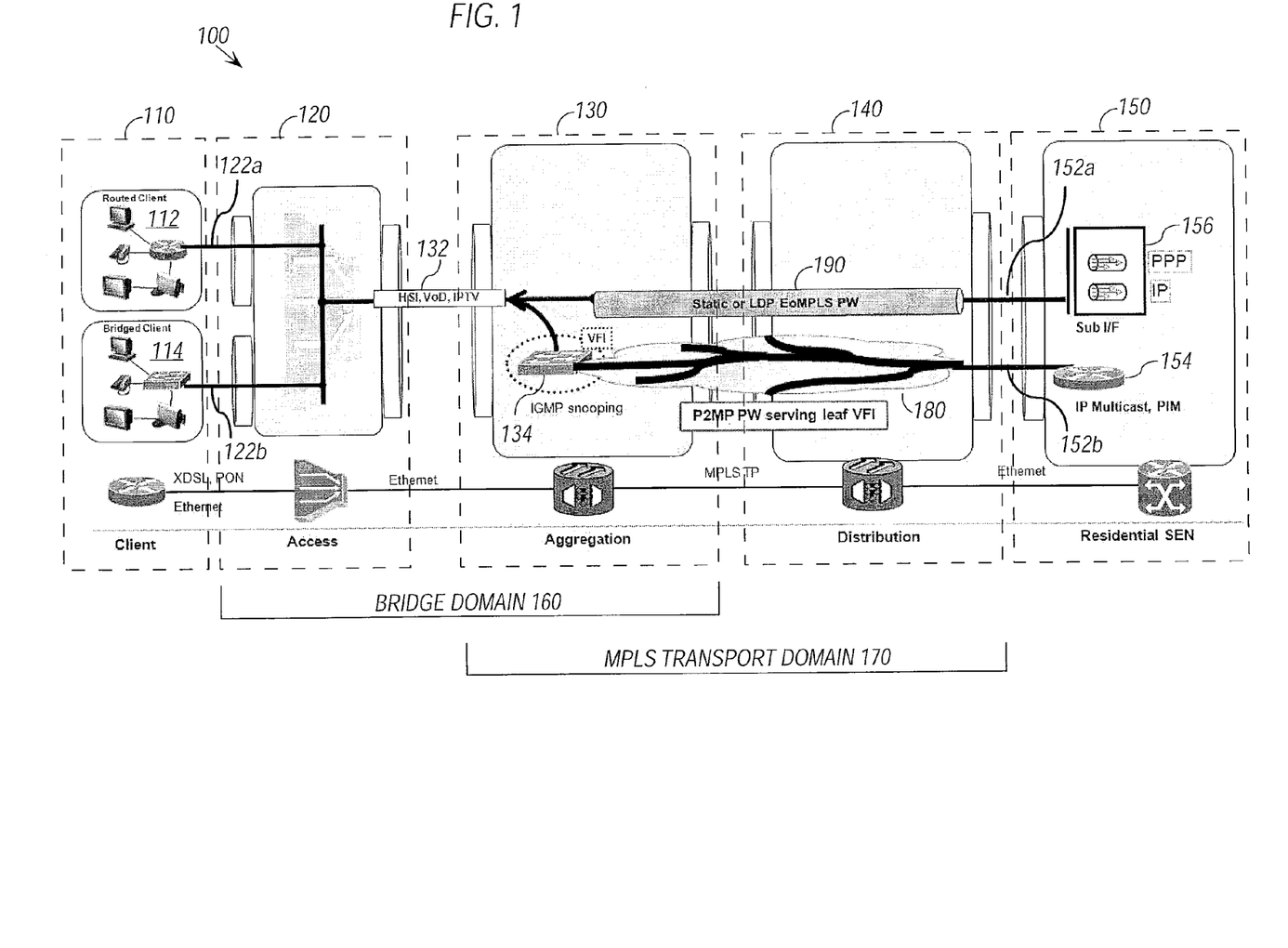
FIG. 1 illustrates an example network arrangement for transporting streaming data from a data source to client devices.

FIG. 1 illustrates an example network configuration for transporting streaming data from a data source to client devices. In an embodiment, a network configuration 100 includes client computing devices 110 and an access node 120, communicatively coupled via network interfaces 122*a* and 122*b*, which may be Digital Subscriber Line (DSL), Ethernet, or Passive Optical Network (PON) network interfaces, etc. Access node 120 is communicatively coupled to aggregation node 130 via network interface 132, which may be an Ethernet, bridged, or IP network interface. Aggregation node 130 is communicatively coupled to distribution node 140 via Ethernet P2MP pseudowire 180 and Ethernet Point-to-Point (P2P) pseudowire 190. In an embodiment, pseudowire 180 of FIG. 1 is used for multicast streams transport or broadcast streams transport over IP or Ethernet and is part of a system for implementing MoFRR protection of these streams, while pseudowire 190 of FIG. 1 is used for the unicast flows transport as described in further detail below.

Distribution node 140 is communicatively coupled to residential Service Edge Node (SEN) 150 via network interfaces 152*a* and 152*b*. In an embodiment, network interfaces 152*a* and 152*b* are Ethernet or Ethernet VLAN network interfaces. Access node 120 initiates a virtual Ethernet bridge domain 160, which is extended to aggregation node 130 through network interface 132. Bridge domain 160 enables bridged connectivity between SEN 150 and client computing devices 110 through pseudowire 190 via network interface 152*a* . Aggregation node 130 and distribution node 140 are part of MPLS transport domain 170.

SEN 150 provides IP multicast and unicast edge forwarding for subscribers and may be implemented by one or more computing devices that are capable of communicating with distribution node 140, including one or more of routers, switches, switch routers, etc. In example network configuration 100, SEN 150 is configured with an Internet Protocol (IP) Multicast/Protocol-Independent Multicast (PIM) router 154 and an Ethernet sub interface 156 capable of communicating data with client computing devices 110 via IP over Ethernet (IPoE) or Point-to-Point Protocol over Ethernet (PPPoE) sessions. Sub interface 156 communicates unicast data via network interface 152*a* and PIM router 154 communicates multicast data over network interface 152*b*. In one embodiment of the invention, SEN 150 is an IP Edge Node for Internet Protocol Television services, i.e., the Broadband Network Gateway (BNG as defined by Broadband Forum TR-101). SEN 150 may also be configured with other mechanisms, processes, interfaces, and functionalities, depending upon a particular implementation.

In one embodiment, SEN 150 provides a multicast data stream, such as an Internet Protocol Television (IPTV) data stream, for a particular multicast group to which one or more of client computing devices 110 subscribe. IPTV is an example of a system that delivers video streams, specifically television video streams, over a packet-switched network.

In an embodiment, distribution node 140 hosts a head end of P2MP pseudowire 180 and a head end of pseudowire 190. Distribution node 140 may be implemented by any type of computing device that is capable of communicating with SEN 150 and aggregation node 130. Distribution node 140 may also be configured with other mechanisms, processes, interfaces, and functionalities, depending upon a particular implementation.

In an embodiment, SEN 150 hosts the head end of P2MP pseudowire 180 and of P2P pseudowire 190. In this embodiment, network interfaces 152*a* and 152*b* between SEN 150 and distribution node 140 are MPLS enabled. Also in this embodiment, distribution node 140 does not host the head end of a pseudowire for which SEN 150 hosts the head end. This embodiment removes the operations associated with Ethernet for network interfaces 152*a* and 152*b* and operations associated with pseudowires 180 and 190 from distribution node 140. This embodiment also improves the flexibility of the connectivity of SEN 150 to MPLS transport domain 170 because it makes SEN 150 part of MPLS transport domain 170.

Aggregation node 130 hosts receivers for P2MP pseudowire 180 and connects client computing devices 110 into P2P pseudowire 190 and may be implemented by any type of computing device that is capable of communicating with access node 120 and distribution node 140, including one or more of routers, switches, switch routers, etc. Aggregation node 130 is also configured with a Virtual Private LAN Service (VPLS) forwarding instance 134 (VFI 134) that performs internet group management protocol (IGMP) snooping. Bridge domain 160 is a virtual multicast receiver for VFI 134. In another embodiment, aggregation node 130 implements snooping for other protocols used for joining multicast groups, such as Multicast Listener Discovery (MLD) for IP V6 multicast groups. Aggregation node 130 may also be configured with other mechanisms, processes, interfaces, and functionalities, depending upon a particular implementation.

Access node 120 provides access for client computing devices 110 to other domains or internetworking devices, and may be implemented by any type of computing device that is capable of communicating with client computing devices 110 and aggregation node 130. In an embodiment, access node 120 comprises a DSL access multiplexer (DSLAM). In an embodiment, access node 120 comprises a PON Optical Line Terminal (OLT). In an embodiment, access node 120 is an Ethernet access node and provides Ethernet bridging. In example network configuration 100, access node 120 is configured with multiple ingress network interfaces 122*a* and 122*b* and at least one egress network interface 132, where the ingress and egress network interfaces of access node 120 are bridged together. Access node 120 may also be configured with other mechanisms, processes, interfaces, and functionalities, depending upon a particular implementation. All unicast and multicast traffic for client computing devices 110 end up in access node 120.

Client computing devices 110 may be implemented by any type of client device. Example implementations of client computing devices 110 include, without limitation, workstations, personal computers, laptop or tablet computers, personal electronic assistants (PDAs), for example, smartphones, televisions, personal media players, and other computing devices. Routed client devices 112 are communicatively connected to network interface 122*a* through an IPv4 or IPv6 routed Customer Premise Equipment (CPE, as defined by Broadband Forum TR-101. Bridged client devices 114 are communicatively connected to network interface 122*b* through a bridged CPE. Client computing devices 110 may be configured with, for example, processors, operating systems, browsers, memory components, etc. Client computing devices 110 may also be configured with other mechanisms, processes, and functionality, depending upon a particular implementation. Client computing devices 110 are examples of client devices that are mapped to bridge domain 160. A further description of a computing device is provided in connection with FIG. 4.

Network interfaces in example network configuration 100 may be implemented with any type of medium and/or mechanism that facilitates the exchange of information between the components of the network configuration, for example, Ethernet, PON, DSL including Asymmetric DSL and Very high speed DSL, etc. Furthermore, the network interfaces may use any type of communications protocol, and may be secured or unsecured, depending upon the requirements of a particular application. In one embodiment, one or more of the network interfaces are part of a virtual local area network (VLAN).

2.2 Multicast Data

Clients at client computing devices 110 may subscribe to a multicast data stream, for example, provided by SEN 150, by sending out an IGMP join report that reaches aggregation node 130 via access node 120. In an embodiment, aggregation node 130 aggregates these joins. Through IGMP snooping, VFI 134 collects IGMP reports from clients connected in bridge domain 160 over network interface 132. When VFI 134 receives the first IGMP join report for a particular multicast group, aggregation node 130 subscribes network interface 132 to the particular multicast group statically joined over P2MP pseudowire 180. Subsequently, aggregation node 130 enables network interface 132 to be a virtual multicast receiver for VFI 134, which receives multicast data for the multicast group via P2MP pseudowire 180. Aggregation node 130 replicates the multicast data to all access nodes corresponding to subscribers of the multicast group, as recorded by VFI 134.

Collection of IGMP reports is performed at aggregation node 130 to optimize the scale of multicast data distribution, i.e., to distribute the collection of IGMP reports to nodes that are logically close to the subscribing client devices. Distributing collection of the IGMP reports to nodes that are logically close to subscribers minimizes the amount of replicated multicast data packets that are propagated through the network.

The collection or aggregation of IGMP reports involves both control plane and data plane functions. In connection with the control plane, VFI 134 receives and records IGMP join reports from client computing devices 110 over network interface 132, which are sent inside the VFI/IGMP grouping pertaining to VFI 134. In connection with the data plane, when a subscriber joins a multicast stream at VFI 134, multicast data associated with the stream is received at aggregation node 130 via P2MP pseudowire 180 and is replicated to the subscriber.

2.3 P2MP Pseudowire Redundancy

Figure 2:
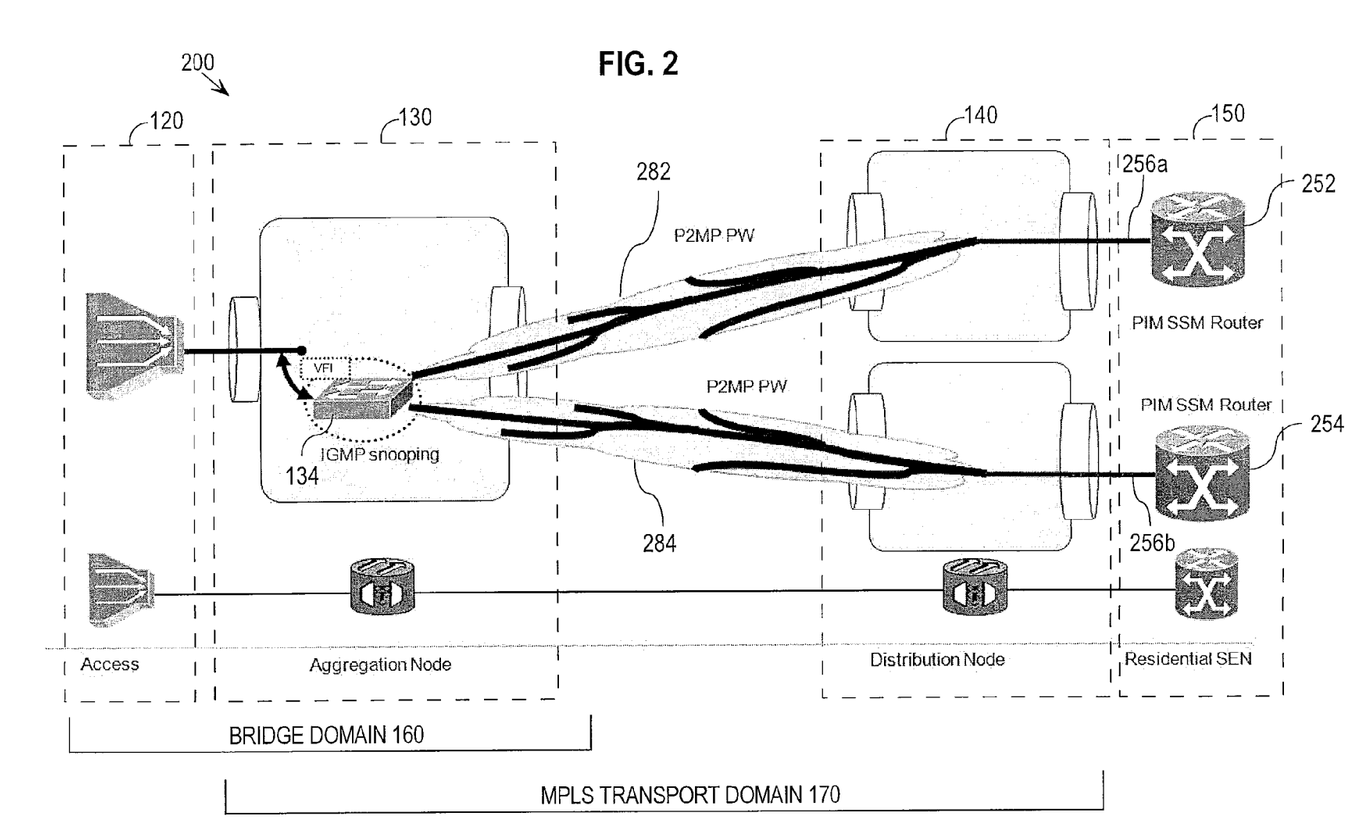
FIG. 2 illustrates an example network configuration in which two P2MP pseudowires are implemented for the same multicast stream.

As previously indicated, pseudowires 180 and 190 of FIG. 1 represent all pseudowires that may implement MoFRR techniques to protect subscribers to multicast data, sent from SEN 150, from experiencing loss of data. FIG. 2 illustrates an example network configuration in which two P2MP pseudowires are implemented for the same multicast stream. In an embodiment, in a network configuration 200, P2MP pseudowire 282 carries multicast data for a particular multicast group from PIM/Source-Specific Multicast (SSM) router 252 to aggregation node 130 and P2MP pseudowire 284 carries multicast data for the same multicast group from PIM/SSM router 254 to aggregation node 130. In network configuration 200, VFI 134 is a virtual bridging forwarding instance that has P2MP pseudowires 282 and 284 as static multicast router ports, such that the IGMP snooping function in VFI 134 knows that multicast sources are over these ports.

In example network configuration 200, P2MP pseudowire 282 and P2MP pseudowire 284 share only one common node, aggregation node 130, so as to assure that the paths taken by the pseudowires are divergent. In another embodiment of the invention, P2MP pseudowire 282 and P2MP pseudowire 284 also share a common multicast data source.

Figure 3:
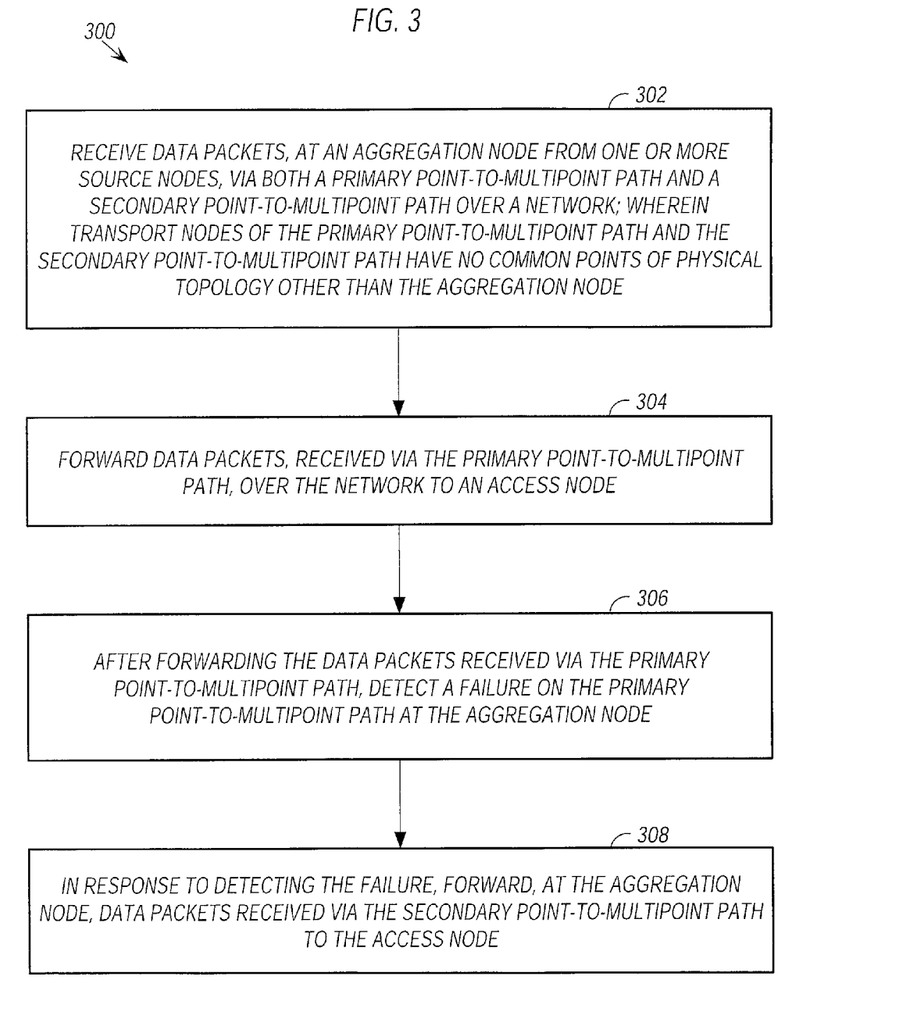
FIG. 3 illustrates a method of using Multicast-only Fast Re-Route techniques to protect users from experiencing data loss in multicast data streams.

FIG. 3 illustrates a method of using MoFRR techniques to protect users from experiencing data loss in multicast data streams.

At block 302, data packets are received, at an aggregation node from one or more source nodes, via both a primary point-to-multipoint path and a secondary point-to-multipoint path over a network; wherein transport nodes of the primary point-to-multipoint path and the secondary point-to-multipoint path have no common points of physical topology other than the aggregation node. For example, in network configuration 200 of FIG. 2, VFI 134 at aggregation node 130 receives multicast data packets via both primary P2MP pseudowire 282 and secondary P2MP pseudowire 284 from PIM/SSM router 252 and PIM/SSM router 254, respectively. In one embodiment, the multicast data from both P2MP pseudowires 282 and 284 is, at least in part, multicast data for a particular multicast group. In an embodiment, data received at VFI 134 via P2MP pseudowire 282 is a duplicate of data received at VFI 134 via P2MP pseudowire 284.

As illustrated in FIG. 2, P2MP pseudowire 282 and P2MP pseudowire 284 have no transport nodes in common, other than aggregation node 130. In one embodiment, the one or more source nodes, for example, PIM/SSM routers 252 and 254, are not considered transport nodes.

In one embodiment, P2MP pseudowire 282 and P2MP pseudowire 284 are static pseudowires, which are enabled over P2MP LSPs that have been statically defined to be divergent. For example, using MPLS-TP, an operator may define different P2MP LSPs for P2MP pseudowires 282 and 284 that are defined as static mrouter ports for the IGMP snooping function in VFI 134 of aggregation node 130. To illustrate in the context of network configuration 200 (FIG. 2), PIM/SSM router 252 has a static join configuration on network interface 256*a* serving P2MP pseudowire 282 and PIM/SSM router 254 has a static join configuration on network interface 256*b* serving P2MP pseudowire 284. When the PIM/SSM routers statically join multicast groups on P2MP pseudowire, then no IGMP join report is needed in the PIM/SSM routers to join the groups.

In another embodiment of the invention, P2MP pseudowire 282 and P2MP pseudowire 284 are signaled by LDP and are enabled over P2MP LSPs signaled by RSVP P2MP TE. The LSP over which P2MP pseudowire 282 is run is defined to be divergent from the LSP over which P2MP pseudowire 284 is run, based on section 4.5 from RFC 4875.

At block 304, IP multicast group data packets, received via the primary point-to-multipoint path, are forwarded over the network to an access node. For example, at least one of client computing devices 110, registered with bridge domain 160, is a subscriber of a particular multicast group, data for which is supplied by both PIM/SSM routers 252 and 254. Aggregation node 130 joins the particular multicast group and VFI 134 receives streaming multicast data for the group via both P2MP pseudowires 282 and 284 from PIM/SSM routers 252 and 254, respectively. Further, multicast data for particular multicast groups reaches all of the aggregation nodes that are leaf nodes of P2MP pseudowire 282 and P2MP pseudowire 284, when the particular multicast groups are statically joined in PIM/SSM routers 252 and 254 over network interfaces 256*a* and 256*b* serving P2MP pseudowires 282 and 284, respectively. A subscriber joins a multicast group in VFI 134, and the IGMP snooping function replicates data for the multicast group to the virtual receiver, e.g., bridge domain 160, that subscribed to the group.

Initially, aggregation node 130 replicates packets for the streaming multicast data received only from P2MP pseudowire 282, which is designated as the primary pseudowire for the multicast group, and forwards the packets to access nodes corresponding to subscribers to the group, for example, access node 120. In an embodiment, P2MP pseudowire 282 is initially designated as the primary pseudowire based on an arbitrary selection of a primary pseudowire between P2MP pseudowires 282 and 284.

At block 306, the aggregation node detects a failure on the primary point-to-multipoint path after forwarding the data packets received via the primary point-to-multipoint path. For example, through an IGMP snooping function that monitors the multicast data at aggregation node 130, aggregation node 130 detects that one or more of the IP multicast group data flows delivered over P2MP pseudowire 282 have lost one or more packets. In one embodiment, aggregation node 130 classifies data loss as a failure after only one packet loss. In another embodiment, aggregation node 130 classifies data loss as a failure after the primary pseudowire has lost a threshold number of data packets, for example, 20 data packets or 30 ms worth of data packets. The threshold number of data packets may be any number of data packets or any amount of time delay set by an administrator prior to the failure. Vidmon functionality used to monitor the quality of the multicast video flows may be used to detect such failures in a multicast data stream. Data collected via the IGMP snooping of VFI 134 allows aggregation node 130 to know of and monitor all of the flows that are coming into the aggregation node. In an embodiment, at block 306, aggregation node 130 detects failures for each of the IP multicast groups data flows delivered over P2MP pseudowire 282.

At block 308, in response to detecting the failure, the aggregation node forwards data packets received via the secondary point-to-multipoint path to the access node. For example, upon detecting a failure for the one or more multicast groups, aggregation node 130 ceases replicating packets for these multicast groups from P2MP pseudowire 282. Aggregation node 130 then replicates packets for the multicast groups received via P2MP pseudowire 284 (the secondary pseudowire) and forwards those packets to access nodes associated with subscribers to the data stream, including access node 120. In other words, aggregation node 130 switches the active source of multicast data from P2MP pseudowire 282 to P2MP pseudowire 284.

In an embodiment, if aggregation node 130 detects no failure of data flow via P2MP pseudowire 282, then aggregation node 130 continues replicating packets for the multicast groups received via P2MP pseudowire 282 and forwarding those packets to access nodes associated with subscribers to the data stream, including access node 120.

In one embodiment, after switching the active source of the multicast data stream to P2MP pseudowire 284, aggregation node 130 monitors data that is received via P2MP pseudowire 284 for failure. Upon identifying a failure in the data stream of P2MP pseudowire 284, aggregation node 130 switches the active source of the multicast stream from P2MP pseudowire 284 to P2MP pseudowire 282.

Switching between two live multicast streams upon failure of one of the streams provides a very fast healing time for the stream. For example, detecting packet loss in a primary stream may require 30 ms and switching to secondary stream data may require 15-20 ms, which provides a healing time of at most 50 ms. 50 ms is a small enough gap in the data stream to avoid a major impact in the user quality of experience, concluding in general to video artifacts but not to service disruption.

Furthermore, Real-time Transport Protocol (RTP) merge operations may be used to provide zero loss protection. To illustrate, a multicast data stream that is based on RTP has sequence numbers for all packets in the stream. Thus, aggregation node 130 can record the sequence numbers of the packets dropped from a primary stream and either recover those dropped packets from data that has been buffered or cached from a secondary stream or start replicating from the secondary stream at the point where the packet losses are detected at the primary stream. To facilitate recovering dropped packets, the secondary stream may be cached for a certain amount of time, for example, tens of milliseconds.

2.4 Unicast Data

Referring to FIG. 1, SEN 150 provides unicast data comprising support information for the multicast stream. In an embodiment where the multicast stream is part of an IPTV distribution service, the unicast support data includes firmware updates, electronic programming guides, etc. In one embodiment, such unicast data is sent to aggregation node 130 by a different path than the path taken by the multicast data stream. To illustrate, unicast data is communicated from sub interface 156 over interface 152a to pseudowire 190, which delivers the unicast data to aggregation node 130. As previously indicated, multicast data is sent over the P2MP pseudowires represented by P2MP pseudowire 180.

In an embodiment, network configuration 200 includes two P2P pseudowires that deliver unicast data to aggregation node 130. A first P2P pseudowire transports unicast data comprising support information for multicast data transported over P2MP pseudowire 282, which unicast data is provided by a unicast data provider at PIM/SSM router 252. A second P2P pseudowire transports unicast data comprising support information for multicast data transported over P2MP pseudowire 284, which unicast data is provided by a unicast data provider at PIM/SSM router 254. In an embodiment, the head ends of the first and second P2P pseudowires reside at PIM/SSM router 252 and PIM/SSM router 254, respectively.

P2P pseudowires, such as pseudowire 190 (FIG. 1), may be static, for example, run over an LSP that has been statically defined using MPLS-TP. P2P pseudowires may also be dynamic, for example, run over an LSP that has been defined using LDP or RSVP-TE. Further, the unicast data exchanged with client computing devices 110 from sub interface 156 via P2P pseudowires may be IPoE or PPPoE encapsulated and is routed using IP in the core network. In another embodiment, unicast data providers send unicast data to aggregation node 130 using a circuit-oriented operational model.

Aggregation node 130 may allow one or more access node interfaces to be virtual multicast receivers for VFI 134. Aggregation Node 130 enables a Virtual Private Wire Service (VPWS) between Access Node 120 and SEN 150 by cross connecting network interface 132 and network interface 152a in an Ethernet P2P pseudowire, such as pseudowire 190, extending in this way virtual bridge domain 160. The virtual multicast receiver function enables network interface 132 to be a virtual bridge port of VFI 134 for multicast services while being cross-connected in pseudowire 190 and associated with bridge domain 160 for the unicast services. This actualization enables wholesale support and different transport for unicast and multicast data. Further, the virtual multicast receiver function at aggregation node 130 merges unicast data from a P2P pseudowire, e.g., pseudowire 190, and the associated multicast data from a P2MP pseudowire, e.g., pseudowire 180, for delivery to access node 120 over network interface 132 and bridge domain 160. Because VFI 134 receives only multicast data, VFI 134 considers the Ethernet unicast data as being received via a virtual port into the multicast bridge domain 160.

In one embodiment, streaming data is transported via P2MP pseudowire implemented on a Packet Optical Transport System (POTS). POTS is a system combining MPLS, optical transport network (OTN), and dense wavelength division multiplexing (DWDM) transport. POTS preserves the operational characteristics of SONET/SDH systems and is well-suited to implementation of MPLS-TP as a tool for creating divergent P2MP pseudowires. Further, in one embodiment, streaming data is transported via P2MP pseudowire implemented on an MPLS based Packet Transport System.

While certain examples the description have referred to multicast data, the techniques herein may be used to prevent data loss for other kinds of subscription streaming data, such as anycast data.

3.0 Implementation Mechanisms—Hardware Overview

Figure 4:
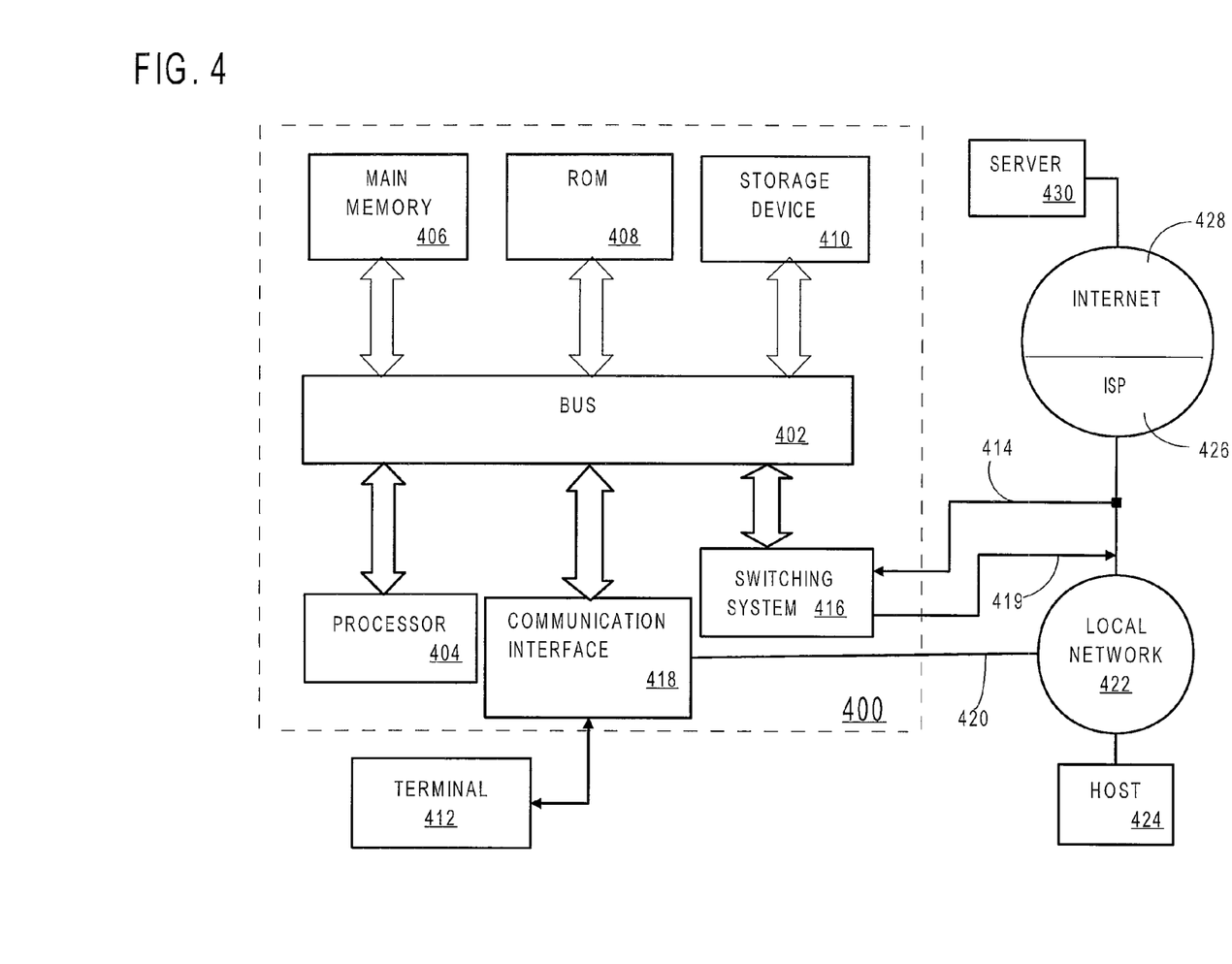
FIG. 4 illustrates a computer system upon which an embodiment may be implemented.

FIG. 4 is a block diagram that illustrates a computer system upon which an embodiment may be implemented. In an embodiment, the techniques herein are implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 418. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for implementing the techniques that are described herein. According to one embodiment, implementing the techniques herein is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process blocks described herein. One or more processors in a multi-processing arrangement may also be employed to execute the sequences of instructions contained in main memory 406. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to processor 404 for execution. Such a medium may take many forms, including but not limited to, non-volatile storage media, volatile storage media, and transmission media. Non-volatile storage media includes, for example, optical or magnetic disks, such as storage device 410. Volatile storage media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other tangible storage medium from which a computer can read.

Various forms of computer readable storage media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In an embodiment, one such downloaded application provides for implementing the techniques as described herein.

The received code may be executed by processor 404 as it is received, and/or stored in storage device 410, or other non-volatile storage for later execution. In this manner, computer system 400 may obtain application code in the form of a carrier wave.

4.0 Extensions And Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving data packets of a video data stream, at an aggregation node from one or more source nodes, via both a primary point-to-multipoint path and a secondary point-to-multipoint path simultaneously over a network;
   wherein transport nodes of the primary point-to-multipoint path and the secondary point-to-multipoint path have no common points of physical topology other than the aggregation node;
   wherein the primary point-to-multipoint path and the secondary point-to-multipoint path are over label-switched paths;
   forwarding data packets of the video data stream, received via the primary point-to-multipoint path, over the network to an access node;
   after forwarding the data packets received via the primary point-to-multipoint path, the aggregation node detecting a failure on the primary point-to-multipoint path;
   in response to detecting the failure, the aggregation node forwarding data packets of the video data stream received via the secondary point-to-multipoint path to the access node.

2. The method of claim 1, wherein the primary point-to-multipoint path and the secondary point-to-multipoint path are dynamic pseudowires over label-switched paths that are established using Resource Reservation Protocol point-to-multipoint Traffic Engineering.

3. The method of claim 1, wherein the primary point-to-multipoint path and the secondary point-to-multipoint path are static pseudowires over static label-switched paths that are established using Multi-Protocol Label Switching-Transport Profile.

4. The method of claim 3, wherein a head end of each of the static pseudowires is a source node of the one or more source nodes.

5. The method of claim 1, wherein the data packets received via the primary point-to-multipoint path and the secondary point-to-multipoint path contain Internet Protocol multicast data that is part of an Internet Protocol Television distribution service.

6. The method of claim 5, further comprising receiving, at the aggregation node, unicast data packets comprising support information for the Internet Protocol Television distribution service.

7. The method of claim 6, wherein the unicast data packets are received via a virtual private wire service between at least one of the one or more source nodes and the aggregation node.

8. The method of claim 1, wherein the primary and secondary point-to-multipoint paths are defined as static multicast router ports in the aggregation node.

9. The method of claim 1, further comprising:
   after forwarding the data packets received via the secondary point-to-multipoint path, detecting a failure on the secondary point-to-multipoint path;
   in response to detecting the failure on the secondary point-to-multipoint path, forwarding data packets received via the primary point-to-multipoint path to the access node.

10. The method of claim 1, further comprising:
    determining a sequence number of a first data packet lost from the primary point-to-multipoint path;
    in response to detecting the failure, forwarding a retrieved data packet from the secondary point-to-multipoint path having the sequence number.

11. The method of claim 10, wherein the retrieved data packet is retrieved from a cache of data packets received via the secondary point-to-multipoint path.

12. A non-transitory computer-readable data storage medium storing one or more sequences of instructions, which instructions, when executed by one or more processors, cause performance of:
    receiving data packets of a video data stream, at an aggregation node from one or more source nodes, via both a primary point-to-multipoint path and a secondary point-to-multipoint path simultaneously over a network;
    wherein transport nodes of the primary point-to-multipoint path and the secondary point-to-multipoint path have no common points of physical topology other than the aggregation node;
    wherein the primary point-to-multipoint path and the secondary point-to-multipoint path are over label-switched paths;
    forwarding data packets of the video data stream, received via the primary point-to-multipoint path, over the network to an access node;
    after forwarding the data packets received via the primary point-to-multipoint path, the aggregation node detecting a failure on the primary point-to-multipoint path;
    in response to detecting the failure, the aggregation node forwarding data packets of the video data stream received via the secondary point-to-multipoint path to the access node.

13. The non-transitory computer-readable data storage medium of claim 12, wherein the primary point-to-multipoint path and the secondary point-to-multipoint path are dynamic pseudowires over label-switched paths that are established using Resource Reservation Protocol point-to-multipoint Traffic Engineering.

14. The non-transitory computer-readable data storage medium of claim 12, wherein the primary point-to-multipoint path and the secondary point-to-multipoint path are static pseudowires over static label-switched paths that are established using Multi-Protocol Label Switching-Transport Profile.

15. The non-transitory computer-readable data storage medium of claim 12, wherein the data packets received via the primary point-to-multipoint path and the secondary point-to-multipoint path contain Internet Protocol multicast data that is part of an Internet Protocol Television distribution service.

16. The non-transitory computer-readable data storage medium of claim 15, further comprising sequences of instructions which when executed cause receiving, at the aggregation node, unicast data packets comprising support information for the Internet Protocol Television distribution service.

17. The non-transitory computer-readable data storage medium of claim 12, further comprising sequences of instructions which when executed cause:
    after forwarding the data packets received via the secondary point-to-multipoint path, detecting a failure on the secondary point-to-multipoint path;
    in response to detecting the failure on the secondary point-to-multipoint path, forwarding data packets received via the primary point-to-multipoint path to the access node.

18. A networked data processing system comprising:
    a subscriber node registered with a bridge domain and subscribed to a particular multicast group;
    an access node associated with the bridge domain;

an aggregation node associated with the bridge domain and configured with: a root of a primary point-to-point pseudowire for transmitting unicast data, a root of a secondary point-to-point pseudowire for transmitting unicast data, a root of a primary point-to-multipoint pseudowire for transmitting multicast data of a video data stream, a root of a secondary point-to-multipoint pseudowire for transmitting multicast data of the video data stream, wherein transport nodes of the primary point-to-multipoint pseudowire and the secondary point-to-multipoint pseudowire have no common points of physical topology other than the aggregation node, wherein the primary point-to-multipoint pseudowire and the secondary point-to-multipoint pseudowire are over label-switched paths;

a VPLS forwarding instance that: performs internet group management protocol snooping, receives multicast data of the video data stream via both the primary and secondary point-to-multipoint pseudowires simultaneously;

a first distribution node configured with a head end of the primary point-to-multipoint pseudowire and with a head end of the primary point-to-point pseudowire;

a second distribution node configured with a head end of the secondary point-to-multipoint pseudowire and with a head end of the secondary point-to point pseudowire;

a first service edge node configured with a primary protocol-independent multicast server communicatively coupled to the primary point-to-multipoint pseudowire and with a primary unicast data provider communicatively coupled to the primary point-to-point pseudowire;

a second service edge node configured with a secondary protocol-independent multicast server communicatively coupled to the secondary point-to-multipoint pseudowire and with a secondary unicast data provider communicatively coupled to the secondary point-to-point pseudowire.

19. The networked data processing system of claim 18, wherein:
the first service edge node and the first distribution node are the same node; and
the second service edge node and the second distribution node are the same node.

20. A computing device comprising:
one or more electronic digital processors;
one or more data packet interfaces coupled to the one or more processors;
a switching system coupled to the one or more interfaces and to the one or more processors and configured to route or switch packets between the one or more interfaces under control of the one or more processors;
one or more non-transitory computer-readable data storage media coupled to the one or more processors and storing one or more sequences of instructions, which instructions, when executed by one or more processors, cause:
receiving data packets of a video data stream, from one or more source nodes, via both a primary point-to-multipoint path and a secondary point-to-multipoint path simultaneously over a network;
wherein transport nodes of the primary point-to-multipoint path and the secondary point-to-multipoint path have no common points of physical topology other than the computing device;
wherein the primary point-to-multipoint path and the secondary point-to-multipoint path are over label-switched paths;
forwarding data packets of the video data stream, received via the primary point-to-multipoint path, over the network to an access node;
after forwarding the data packets received via the primary point-to-multipoint path, detecting a failure on the primary point-to-multipoint path;
in response to detecting the failure, forwarding data packets of the video data stream received via the secondary point-to-multipoint path to the access node.

21. The computing device of claim 20, wherein the primary point-to-multipoint path and the secondary point-to-multipoint path are dynamic pseudowires over label-switched paths that are established using Resource Reservation Protocol point-to-multipoint Traffic Engineering.

22. The computing device of claim 20, wherein the primary point-to-multipoint path and the secondary point-to-multipoint path are static pseudowires over static label-switched paths that are established using Multi-Protocol Label Switching-Transport Profile.

23. The computing device of claim 20, wherein the data packets received via the primary point-to-multipoint path and the secondary point-to-multipoint path contain Internet Protocol multicast data that is part of an Internet Protocol Television distribution service.

24. The computing device of claim 23, further comprising sequences of instructions which when executed cause receiving unicast data packets comprising support information for the Internet Protocol Television distribution service.

25. The computing device of claim 20, further comprising sequences of instructions which when executed cause:
after forwarding the data packets received via the secondary point-to-multipoint path, detecting a failure on the secondary point-to-multipoint path;
in response to detecting the failure on the secondary point-to-multipoint path, forwarding data packets received via the primary point-to-multipoint path to the access node.

26. The method of claim 1 wherein detecting the failure is based on detecting a loss of a data packet on the primary point-to-multipoint path.

27. The non-transitory computer-readable data storage medium of claim 12, wherein detecting the failure is based on detecting a loss of a data packet on the primary point-to-multipoint path.

28. The computing device of claim 20, wherein detecting the failure is based on detecting a loss of a data packet on the primary point-to-multipoint path.

* * * * *